United States Patent
Ebiko

(10) Patent No.: US 8,417,280 B2
(45) Date of Patent: Apr. 9, 2013

(54) RADIO COMMUNICATION BASE STATION DEVICE AND TRANSMISSION POWER CONTROL METHOD

(75) Inventor: Keisuke Ebiko, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/128,849

(22) PCT Filed: Nov. 27, 2009

(86) PCT No.: PCT/JP2009/006430
§ 371 (c)(1),
(2), (4) Date: May 11, 2011

(87) PCT Pub. No.: WO2010/061626
PCT Pub. Date: Jun. 3, 2010

(65) Prior Publication Data
US 2011/0223964 A1    Sep. 15, 2011

(30) Foreign Application Priority Data
Nov. 28, 2008  (JP) ................................. 2008-304662

(51) Int. Cl.
*H04B 7/00* (2006.01)
(52) U.S. Cl. .... 455/522; 455/507; 455/63.1; 455/67.13; 455/423; 455/452.2; 370/318; 370/252
(58) Field of Classification Search .................. 455/522, 455/500, 507, 517, 561, 13.4, 67.11, 63.1, 455/67.13, 67.14, 422.1, 423–424, 452.1–452.2; 370/318, 329, 252
See application file for complete search history.

(56) References Cited

U.S. PATENT DOCUMENTS
2008/0188265 A1    8/2008    Carter
2011/0003559 A1    1/2011    Morita FOREIGN PATENT DOCUMENTS
JP    2009-119212    6/2009
WO    2009/122778    10/2009

OTHER PUBLICATIONS
International Search Report dated Jan. 27, 2010.
3GPP TSG-RAN WG4 (Radio) Meeting #48bis, "Text Proposal for HNB TR25.9xx: Revised Guidance on UL interference mitigation," Vodafone Group, et al., R4-082643, Sep. 29-Oct. 3, 2008, pp. 1-11.
3GPP TSG-RAN Working Group 4 (Radio) meeting #48bis, "Merged Text Proposals for TR 25.9xx—Home NodeB RF," Vodafone Group, et al., R4-082623, Sep. 29-Oct. 3, 2008, pp. 1-18.

*Primary Examiner* — Shaima Q Aminzay
(74) *Attorney, Agent, or Firm* — Dickinson Wright PLLC

(57) ABSTRACT

Provided are a base station device and a transmission power control method that reduce interference with an uplink radio channel from a femto-connected terminal to a macrocell base station while avoiding an increase in signaling. A measurement unit (103) measures the macrocell signal reception level, and a propagation loss estimating unit (104) estimates propagation loss between a HUE and a HNB based on the HUE signal reception power, for example. A judgment unit (105) performs a first comparison of the macrocell signal reception level with a first threshold value and a second comparison of the propagation loss with a second threshold value, and an adjustment unit (106) generates a command to reduce the maximum value that is possible for the target control value for the HNB total reception power when the macrocell signal reception level is at least the first threshold value and the propagation loss is at least the second threshold value. A scheduler (107) determined a transmission rate allocated to the HUE based on the HUE signal and the maximum value that is possible for the target control value for the HNB total reception power.

8 Claims, 18 Drawing Sheets

RADIO COMMUNICATION BASE STATION DEVICE AND TRANSMISSION POWER CONTROL METHOD

TECHNICAL FIELD

The present invention relates to a radio communication base station apparatus and a transmission power control method for controlling transmission power in an uplink radio channel.

BACKGROUND ART

In buildings for households and offices, installation of a radio communication base station apparatus (a femto base station or a home node-B, also referred to as "HNB") that covers a small cell or a femtocell having a cell radius of several tens of meters is considered. FIG. 1 shows the configuration of a radio system including an HNB. A mobile terminal located in the buildings in which an HNB is installed transmits data to and receives data from the HNB via a radio channel. The HNB uses a fixed-line network such as an optical fiber as a backbone to connect with a core network via a concentrator (GW).

When HNBs become prevalent, it is expected that a femtocell and a macrocell share the same frequency band in urban areas and are operated in the hierarchical cell arrangement shown in FIG. 1. In addition, it is also expected that access to an HNB is limited only to a registered user (a closed subscriber group, CSG). Such an operation, however, raises a problem of increased uplink radio channel interference between a macrocell and a femtocell. That is to say, there is a possibility that a tradeoff occurs in which, when throughput increases in one cell, the other cell suffers increased radio interference and decreased throughput.

One example of uplink radio channel interference between a macrocell and femtocells is uplink radio channel interference from user equipment connected to the macrocell (hereinafter referred to as "MUE") to the HNB. In particular, MUE radio transmission power increases when the distance between the macro base station (hereinafter referred to as "MNB") and the MUE becomes greater. Therefore, when a femtocell is located at a macrocell edge, it is necessary to take measures against interference from the MUE that does not have an access right to the HNB. As specific measures, Non-Patent Literature 1 describes increasing the target control value of total HNB reception power depending on interference level at an HNB and adjusting receiver gain at the HNB.

A second example of uplink radio channel interference between a macrocell and a femtocell is uplink radio channel interference from user equipment connected to a femtocell (hereinafter referred to as "HUE") to an MNB. In particular, when the distance between an HUE and an HNB is long and the distance between the HUE and an MNB is short, the amount of interference from the HUE to the MNB increases. Therefore, when a femtocell is located at the center of a macrocell, it is necessary to suppress interference from an HUE to an MNB. As specific measures, Non-Patent Literature 1 and Patent Literature 1 describe limiting the maximum HUE transmission power.

Now, a method of limiting the maximum HUE transmission power will be described in detail. FIG. 2 is a sequence diagram showing the steps of restricting the maximum HUE transmission power described in Non-Patent Literature 1. FIG. 2 picks up and shows only parts that relate to uplink interference control. The 3rd generation partnership project (3GPP) release. 6 (HSUPA) presumes an uplink access method.

An HNB is provided with a function of measuring a reception level of a macrocell signal (a downlink common pilot channel (CPICH), for example) (measurement section 24). Measurement section 24 measures a macrocell signal reception level when an HNB is started, for example (ST 11). More specifically, as described in Non-Patent Literature 2, the RSCP of a macrocell CPICH is measured and information about P-CPICH transmission power is obtained. Measurement section 24 reports the measurement result to control section 23 (ST 12). Control section 23 uses the reported measurement result to determine the maximum HUE transmission power (ST 13). Control section 23 lowers the set value of the maximum HUE transmission power when the macrocell signal reception level becomes greater.

When the HUE starts connecting with the HNB, radio resource control (RRC) connection is established (ST 14). In this case, control section 23 of the HNB reports a setting of the maximum HUE transmission power to HUE 21. HUE 21 transmits an uplink radio signal within the range of the reported maximum HUE transmission power.

HUE 21 measures the macrocell signal reception level based on the command from the HNB (ST 15), and reports the measured value to the HNB (ST 16). Control section 23 of the HNB updates the set value of the maximum transmission power of HUE 21 based on the value reported from the HUE 21, and reports the set value to HUE 21 (ST 16). HUE 21 transmits an uplink radio signal within the range of the updated and reported maximum transmission power.

FIGS. 3(a) and 3(b) show changes of HNB reception power and HUE transmission power, respectively, when the above-described interference control is used. In FIG. 3, the horizontal axis of the graph indicates path loss between an HNB and an HUE. In FIG. 3(a), the vertical axis of the graph indicates reception power, and, in FIG. 3(b), the vertical axis of the graph indicates transmission power.

As is clear in FIG. 3, the target control value of total HNB reception power (RoT target) is constant regardless of the spatial path loss between an HNB and an HUE (hereinafter referred to as path loss) or the macrocell signal reception level. On the other hand, the maximum value of total HUE transmission power is adjusted depending on the macrocell signal reception level at the HNB.

In FIG. 3, bold solid lines indicate the power value. FIG. 3 shows that total HUE transmission power reaches the maximum value and HNB reception power is lowered when an HUE moves away from an HNB and path loss between the HNB and the HUE becomes greater.

Here, the ratio of the transmission power of HSUPA channel (E-DCH) to the transmission power of dedicated physical control channel (DPCCH) constituting W-CDMA channel (DCH) is defined. It is defined that the power ratio increases (transmission power increases) when the E-DCH transmission rate increases so that required power increases as the E-DCH transmission rate increases.

Because the transmission power of DCH is controlled so that the reception quality at the base station is set at the desired value, the transmission power of E-DCH increases in proportion to DCH when path loss becomes greater. Here, when HUE transmission power reaches the maximum value, the required power that is suitable for the E-DCH transmission rate cannot be secured. In this case, the HSUPA scheduler of the HNB lowers the transmission rate to allocate to the HUE based on the transmission power headroom reported by the HUE (UE power headroom), for example.

CITATION LIST

Patent Literature

PTL1
United States Patent Publication No. 2008-0188265A1

Non-Patent Literature

NPL1
3GPP TSG RAN Working Group 4, R4-082643
NPL2
3GPP TSG RAN Working Group 4, R4-082623

SUMMARY OF INVENTION

Technical Problem

However, the above-described method for directly controlling the maximum HUE transmission power has the following problem: That is, as is obvious in FIG. 2, after an HNB determines the maximum HUE transmission power, the HNB needs to report the determination result (signaling) to the HUE, thus wasting radio resources and lowering the data transmission efficiency. In particular, to precisely control interference, it is necessary to frequently update the maximum HUE transmission power using the measured result of the macrocell signal reception level at the HUE. This increases the amount of signaling, further lowering the data transmission efficiency.

Further, as is obvious in FIG. 3, because this method reduces interference by sacrificing only the HUE having greater path loss with the HNB, the transmission rate of an uplink channel with respect to only the HUE located at a femtocell edge is drastically lowered.

It is therefore an object of the present invention to provide a radio communication base station apparatus and a transmission power control method for preventing increase in signaling and decrease of the transmission rate of femto user equipment at a femtocell edge, and for reducing uplink radio channel interference from femto user equipment to a macro base station.

Solution to Problem

A radio communication base station apparatus comprising: a measurement section that measures reception levels of signals transmitted from a macrocell radio communication base station apparatus; an estimation section that estimates path losses between the radio communication base station apparatus and radio communication terminal apparatuses that are connected to the radio communication base station apparatus; a determination section that compares a maximum reception level out of the measured reception levels with a first threshold value and compares a maximum path loss out of the estimated path losses with a second threshold; and an adjustment section that lowers a maximum possible value of a target control value of total reception power at the radio communication base station apparatus when the maximum reception level is equal to or greater than the first threshold value and the maximum path loss is equal to or greater than the second threshold value.

A transmission power control method comprising: a measurement step of measuring reception levels of signals transmitted from a macrocell radio communication base station apparatus; an estimation step of estimating path losses between the radio communication base station apparatus and radio communication terminal apparatuses that are connected to the radio communication base station apparatus; a determination step of comparing a maximum reception level out of measured reception levels with a first threshold value and of comparing a maximum path loss out of the estimated path losses with a second threshold; and an adjustment step of lowering a maximum possible value of a target control value of total reception power at the radio communication base station apparatus when the maximum reception level is equal to or greater than the first threshold value and the maximum path loss is equal to or greater than the second threshold value.

Advantageous Effects of Invention

According to the present invention, it is possible to prevent increase in signaling and decrease of the transmission rate of femto user equipment, and to reduce uplink radio channel interference from femto user equipment to a macro base station.

DESCRIPTION OF EMBODIMENTS

Now, embodiments of the present invention will be described in detail with reference to the accompanying drawings. Although the following embodiments will be described based on the HSUPA radio access technology, the present invention is by no means limited to long term evolution (LTE) which is being standardized by the 3GPP or other radio access technologies standardized by the 3GPP, and is applicable to the wireless local area network (WLAN), the worldwide interoperability for microwave access (WiMAX) including IEEE 802.16, IEEE 802.16e, or IEEE 802.16m, or other radio access technologies standardized by the 3GPP2, for example.

Embodiment 1

Figure 1:
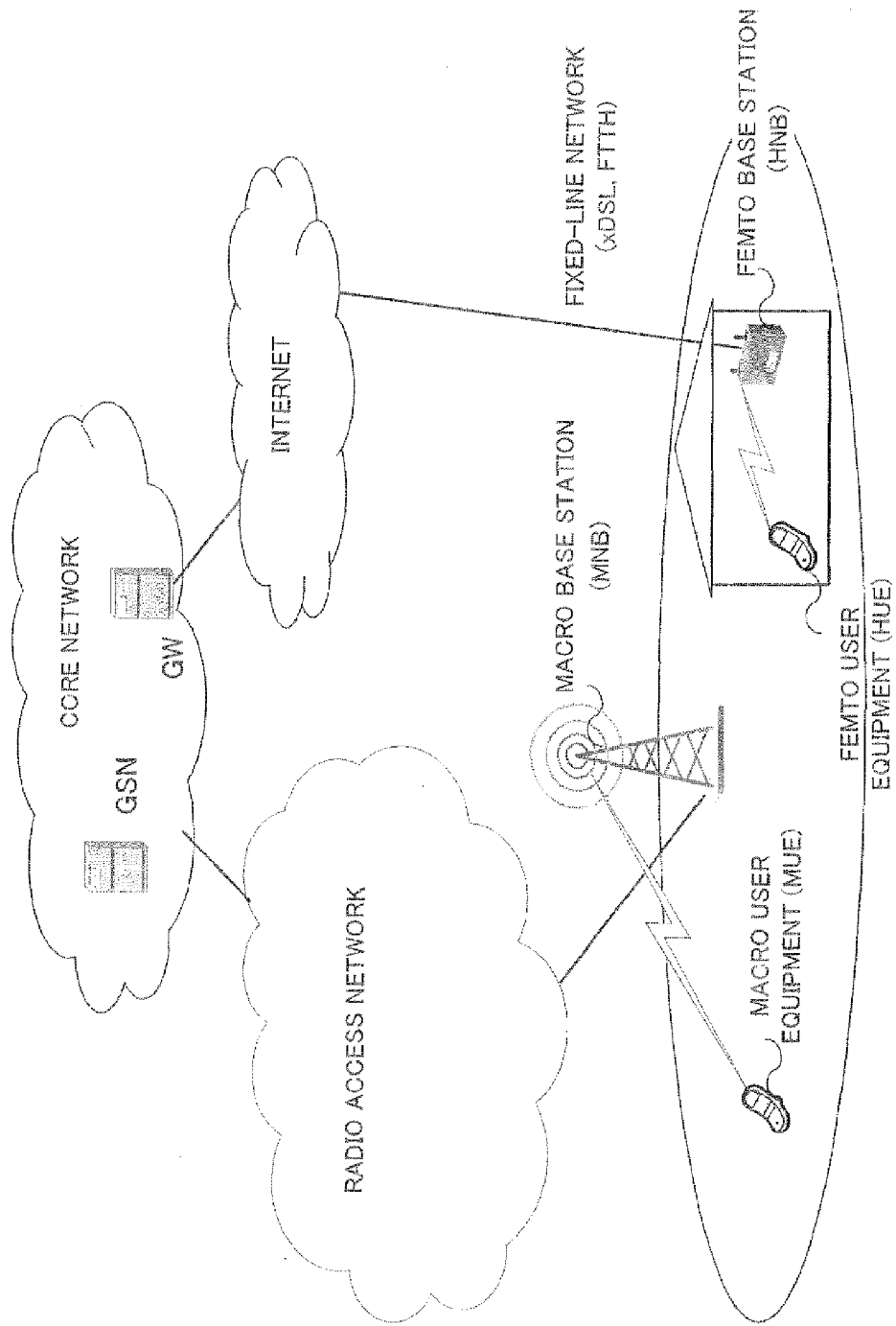
FIG. 1 is a graph showing the configuration of a radio system including an HNB.
Figure 2:
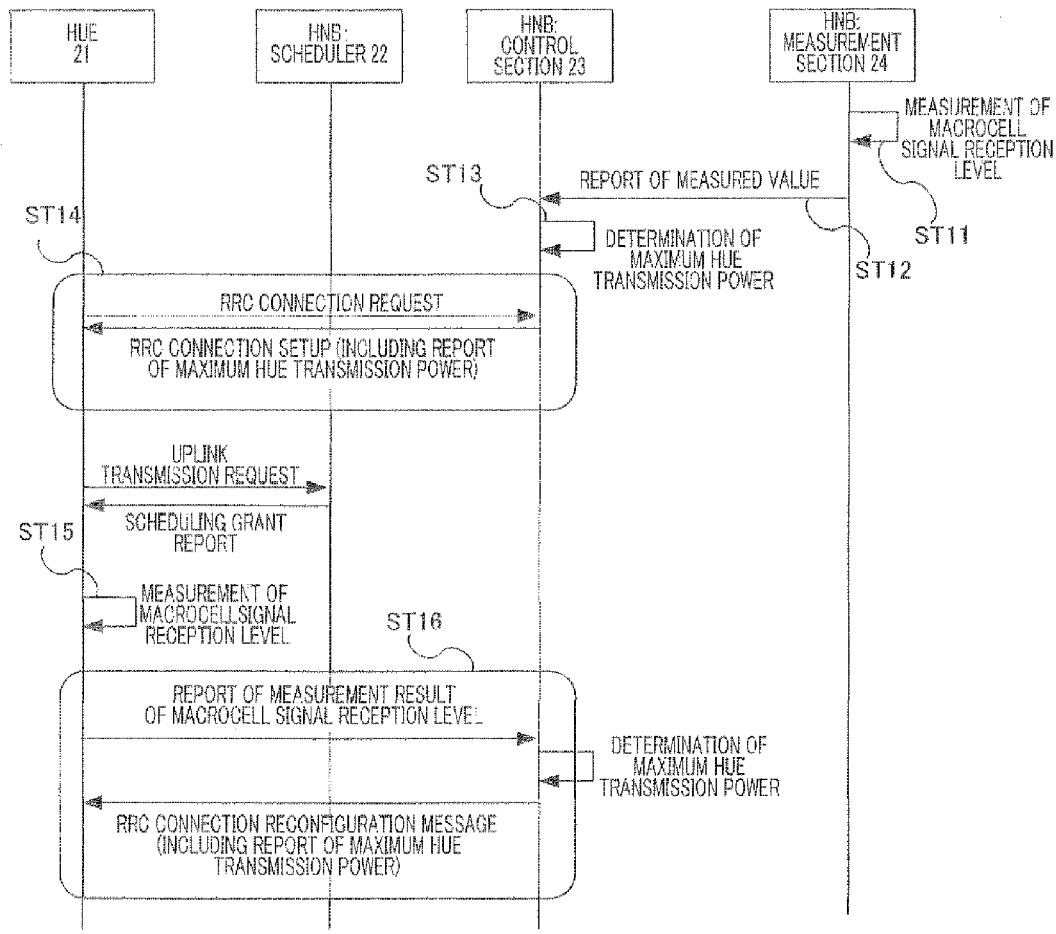
FIG. 2 is a sequence diagram showing the steps of limiting the maximum HUE transmission power described in Non-Patent Literature 1.
Figures 3A, 3B:
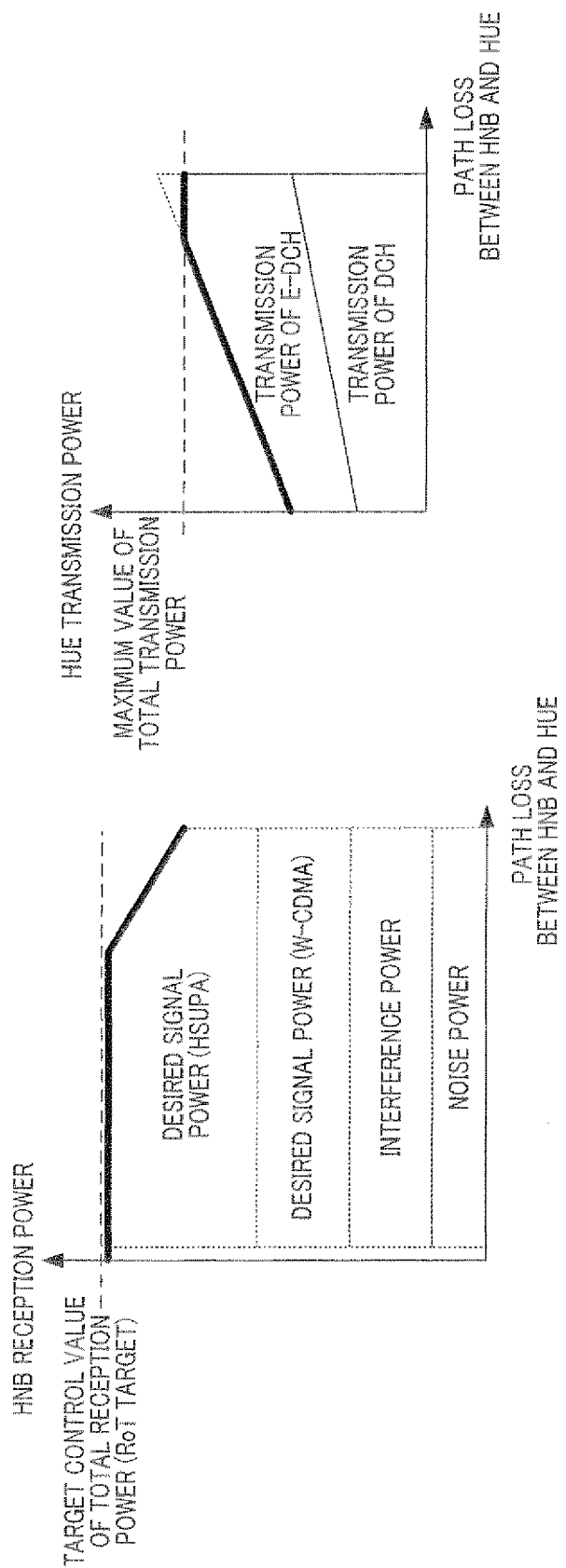
FIG. 3 shows changes of HNB reception power and HUE transmission power when the interference control described in Non-Patent Literature 1 is used.
Figure 4:
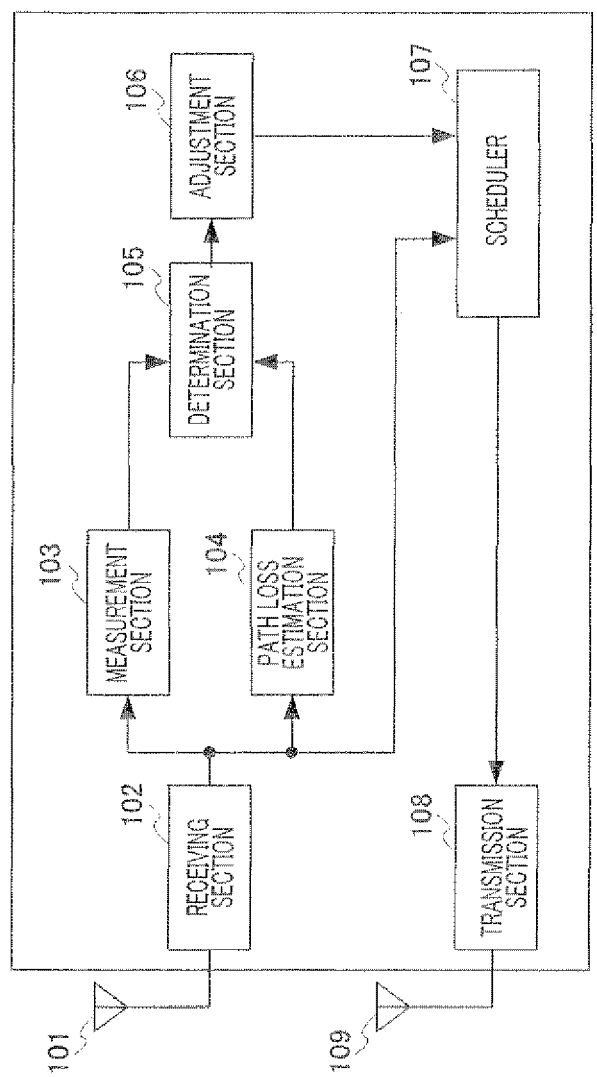
FIG. 4 is a block diagram showing the configuration of a femtocell base station according to Embodiment 1 of the present invention.

FIG. 4 is a block diagram showing the configuration of a femtocell base station according to Embodiment 1 of the present invention. In FIG. 4, receiving section 102 receives a signal transmitted from an MNB macrocell signal) and a signal transmitted from an HUE (an HUE signal) via antenna 101, outputs the macrocell signal to measurement section 103, and outputs the HUE signal to path loss estimation section 104 and scheduler 107.

Measurement section 103 measures the reception level of the macrocell signal output from receiving section 102, such as a downlink common pilot channel (CPICH), and outputs the measurement result to determination section 105. When a plurality of macrocell signals are measured, measurement section 103 outputs the maximum reception level to determination section 105. Measurement section 103 may measure only signals of a macrocell that uses the same frequency band as for a femtocell uplink radio channel, because the amount of interference to a macrosell is small when the macrocell uses the frequency band neighboring to the frequency band for a femtocell uplink radio channel.

Path loss estimation section 104 estimates path loss between an HUE and an HNB based on reception power of the HUE signal output from receiving section 102, such as an uplink pilot signal, and outputs the estimation result to determination section 105. When a plurality of HUEs are connected at the same time, path loss estimation section 104 outputs the maximum path loss to determination section 105.

Determination section 105 compares the microcell signal reception level output from measurement 103 with a first threshold value, and outputs the first comparison result to adjustment section 106. Further, determination section 105 compares the path loss output from path loss estimation section 104 and a second threshold, and outputs the second comparison result to adjustment section 106.

Adjustment section 106 generates a command for adjusting the maximum possible value of the target control value of total HNB reception power based on the first comparison result and the second comparison result output from determination section 105, and outputs the generated command to scheduler 107.

Scheduler 107 determines a transmission rate to allocate to the HUE based on an HUE signal output from receiving section 102, specifically, a signal containing a transmission buffer status, transmission power headroom, and request for improving transmission rate to allocate, and based on the maximum possible value of the target control value of total HNB reception power that is designated by adjustment section 106. The algorithm for allocating the transmission rate at scheduler 107 itself will not be changed by adding interference control. When the maximum possible value of the target control value of total HNB reception power is lowered, scheduler 107 adjusts the transmission rate to allocate to an HUE lower. Change of the target control value influences the transmission rate to allocate to all HUES connected to the HNB. Scheduler 107 outputs a scheduling grant indicating the determined allocated transmission rate to transmission section 108.

Transmission section 108 transmits the scheduling grant output from scheduler 107 to the HUE.

Figure 5:
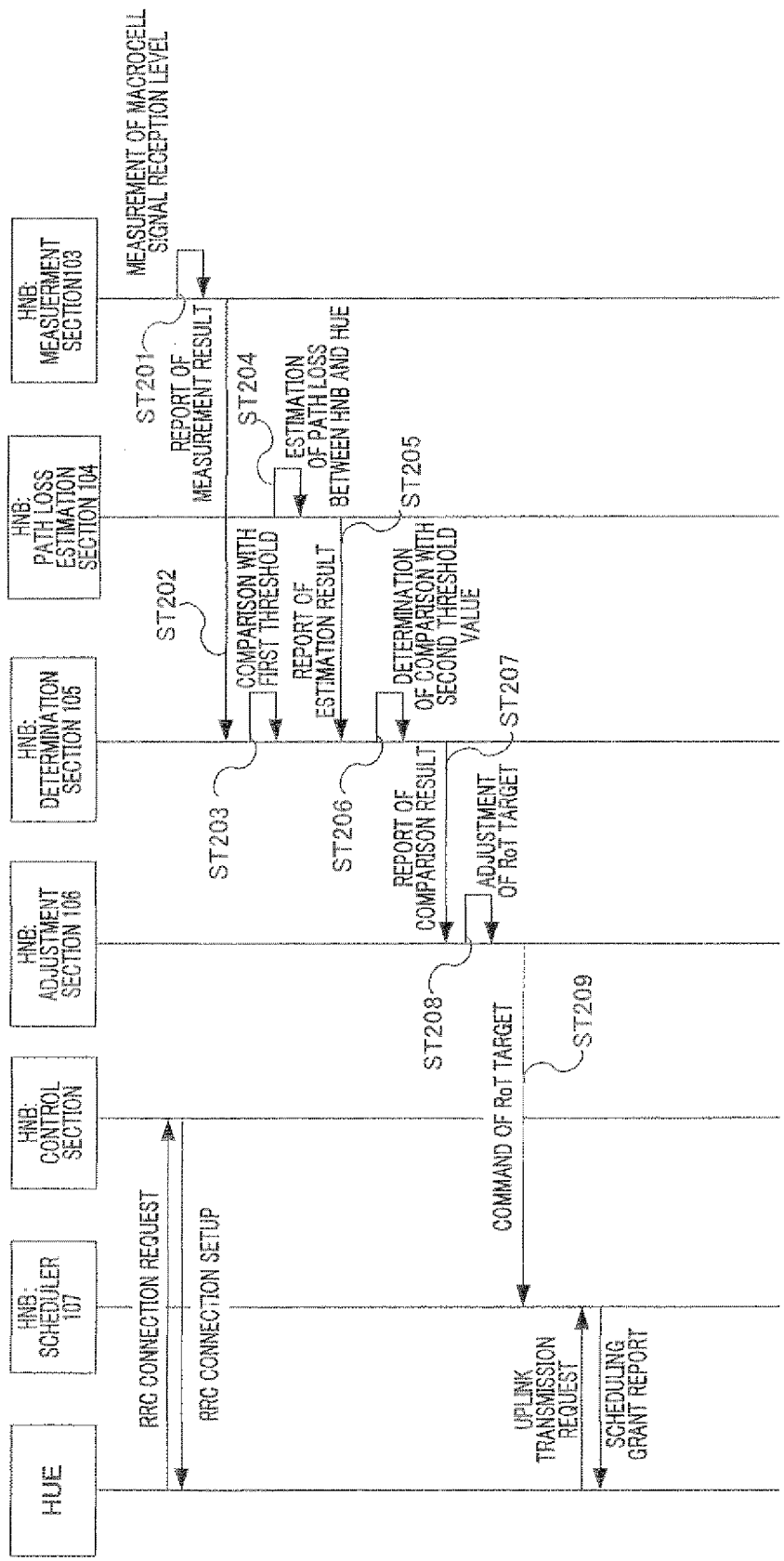
FIG. 5 is a sequence diagram showing the steps of interference control according to Embodiment 1 of the present invention.

FIG. 5 is a sequence diagram showing the steps of interference control according to Embodiment 1 of the present invention. In FIG. 5, measurement section 103 of the HNB measures the macrocell signal reception level (ST 201), and outputs the measurement result to determination section 105 (ST 202). Determination section 105 compares the macrocell signal reception level with the first threshold (ST 203).

Path loss estimation section 104 estimates path loss between an HUE and an HNB based on information such as an HUE signal reception power (ST 204), and outputs the estimation result to determination section 105 (ST 205). Determination section 105 compares path loss and the second threshold (ST 206), and outputs the first comparison result in ST 203 and the second comparison result in ST 206 to adjustment section 106 (ST 207).

Adjustment section 106 generates a command for adjusting the maximum possible value of the target control value of total HNB reception power (RoT target) based on the first comparison result and the second comparison result (ST 208), and outputs the generated command to scheduler 107 (ST 209).

As is obvious in FIG. 5, because processes for interference control is performed only inside an HNB, it is not necessary to add signaling for interference control between an HUE and an HNB.

Figure 6:
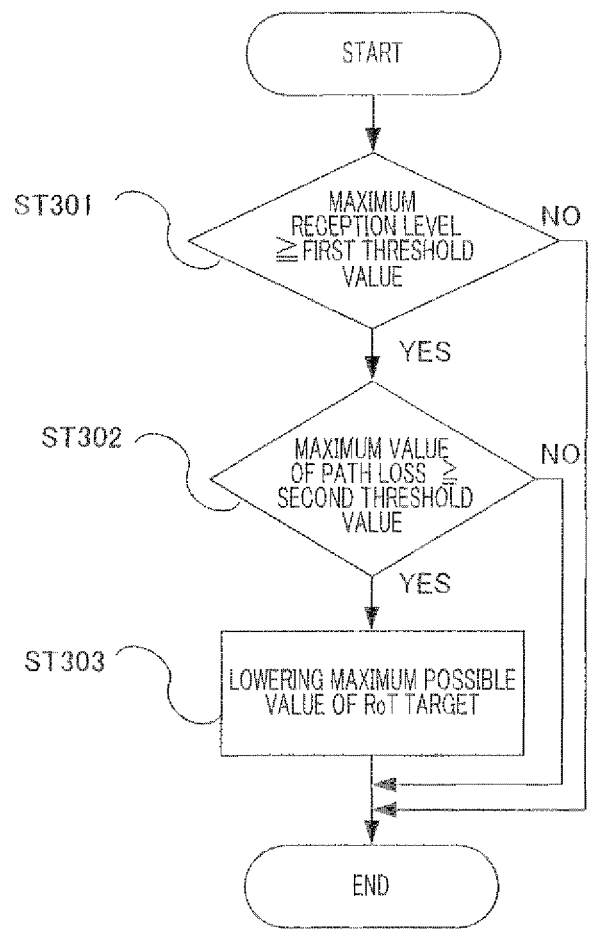
FIG. 6 is a flowchart showing the steps of interference control at the determination section according to Embodiment 1 of the present invention.

FIG. 6 is a flowchart showing the steps of interference control at determination section 105 according to Embodiment 1 of the present invention. There are two determination conditions for interference control: the first determination condition is a comparison between the macrocell signal reception level and the first threshold value (ST 301). The first determination condition is met when a femtocell is located at the center part of a macrocell. The second determination condition is a comparison of path loss between an HUE and an HNB with a second threshold value (ST 302). The second determination condition is met when there is a long distance between an HUE and an HNB. Only when the two determination conditions are met at the same time, the maximum possible value of the target control value of total HNB reception power is lowered to reduce the amount of interference from an HUE to an MNB (ST 303).

Here, whichever one of the two determination conditions can be the first in order to be processed. The flowchart shown in FIG. 6 shows merely an example of implementation, therefore each step can be implemented in a different order. For example, determination step ST 301 can be performed after determination step ST 302 is performed.

Figure 7:
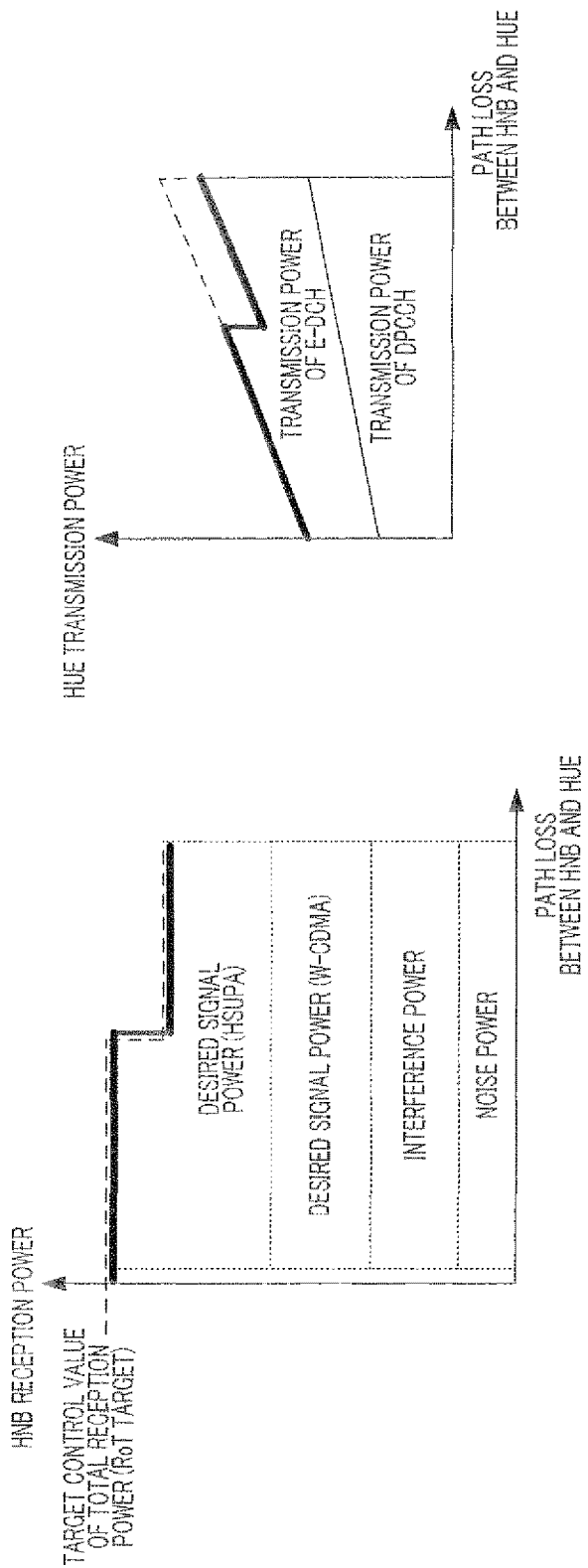
FIG. 7 shows changes of HNB reception power and HUE transmission power when interference control is used according to Embodiment 1 of the present invention.

FIG. 7 shows changes of HNB reception power and HUE transmission power when interference control is used according to Embodiment 1 the present invention. In FIG. 7, the horizontal axis of the graph indicates path loss between an HNB and an HUE. In FIG. 7(a), the vertical axis of the graph indicates HNB reception power and in FIG. 7(b), the vertical axis of the graph indicates HUE transmission power.

Here, the target control value of total HNB reception power (RoT target) varies depending on path loss between an HNB and an HUE and the macrocell signal reception level at the HNB. FIG. 7(a) illustrates the target control value of reception power when the macrocell signal reception level is equal to or greater than the first threshold value. On the other hand, the maximum value of total HUE transmission power is a constant value.

In FIG. 7, bold solid lines indicate the power value. When the distance between the HUE and the HNB is large and path loss between the HNB and the HUE becomes equal to or greater than the second threshold value, the target control value of total HNB reception power (RoT target) is lowered. As the RoT target is lowered, the transmission rate to allocate to the HUE is lowered and thus the required HUE transmission power is also decreased. Here, it should be noted that the maximum value for HUE transmission power itself is not lowered. Accordingly, as shown in FIG. 7(b), HUE transmission power increases when path loss between an HNB and an HUE increases.

When a femtocell is located at the center part of a macrocell, extremely strong interference occurs from the macrocell to the femtocell downlink radio channel, thus reducing the coverage area of the femtocell to a cell radius of several meters. Accordingly, path loss between an HNB and an HUE within the coverage area of a femtocell is limited to a certain range. In the present embodiment, the amount of interference from a femtocell to a macrocell is limited even when HUE transmission power increases as path loss between an HNB and an HUE increases.

When a plurality of HUEs are connected to an HNB at the same time a transmission rate to allocate and transmission power of the HUEs in the vicinity of the HNB are decreased more than the case where the maximum HUE transmission power is restricted using the conventional interference reduction method. Accordingly, by setting the range of lowering the target control value and the second threshold value adequately, it is possible to increase the transmission rate to allocate to the HUE located at a femtocell edge more than the conventional interference reduction method while maintaining the amount of interference to reduce in the whole femtocell.

Figure 8:
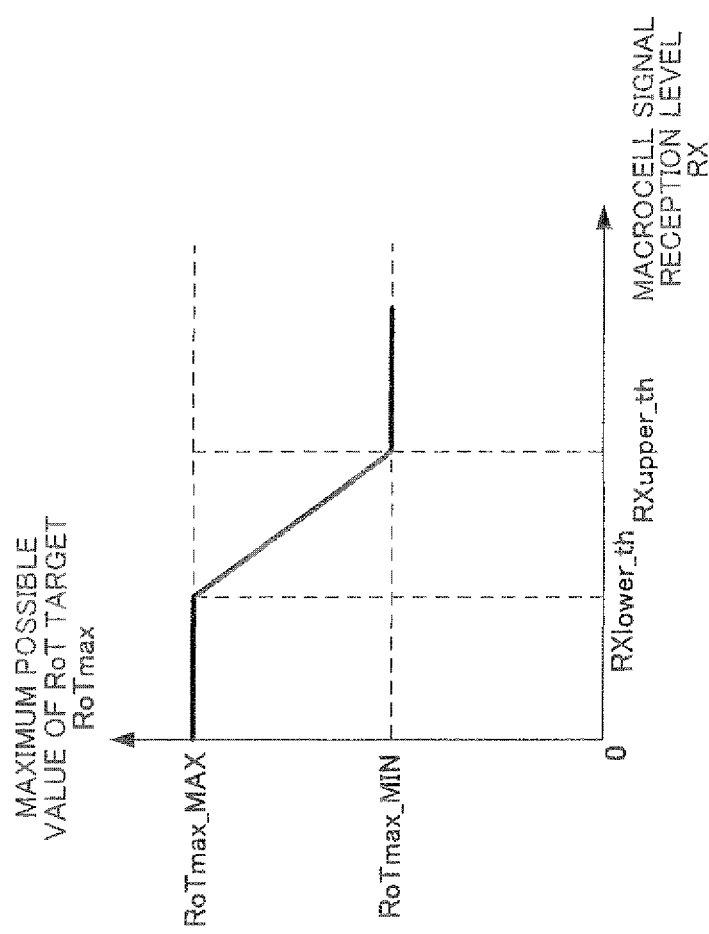
FIG. 8 is a graph showing the relationship between the macrocell signal reception level and the maximum possible value of the target control value of total reception power at a femto base station according to Embodiment 1 of the present invention.

FIG. 8 is a graph showing the relationship between the maximum possible value of the target control value (RoT target) at a femto base station and the macrocell signal reception level according to Embodiment 1 of the present invention. In FIG. 8, the horizontal axis of the graph indicates the macrocell signal reception level, and the vertical axis indicates the maximum possible value of the target control value of total reception power (RoT target). The bold solid line indicates an example of control functions. Examples of control functions are not limited to the control function used in FIG. 8, and may include any functions with which the maximum possible value of the target control value of total HNB reception power decreases when a macrocell signal reception level increases.

As described above, according to Embodiment 1, it is possible to indirectly limit HUE transmission power by adjusting the maximum possible value of the target control value of total HNB reception power, instead of by directly controlling the maximum value of HUE transmission power. By this means, it is possible to prevent increase in signaling accompanying direct control of HUE transmission power, and it is possible to reduce uplink radio channel interference from an HUE to an MNB without wasting radio resources. Further, it is also possible to increase the transmission rate to allocate to the HUE that is located at a femtocell edge while maintaining the amount of interference to reduce in the whole femtocell.

Embodiment 2

A case will be described with Embodiment 2 where, in addition to the function of interference control described in Embodiment 1, a function of changing the second threshold value depending on the macrocell signal reception power level at an HNB is provided. The configuration of a femtocell base station apparatus according to Embodiment 2 will be explained using FIG. 4 because the configuration is the same as the configuration of Embodiment 1 shown in FIG. 4.

Figure 9:
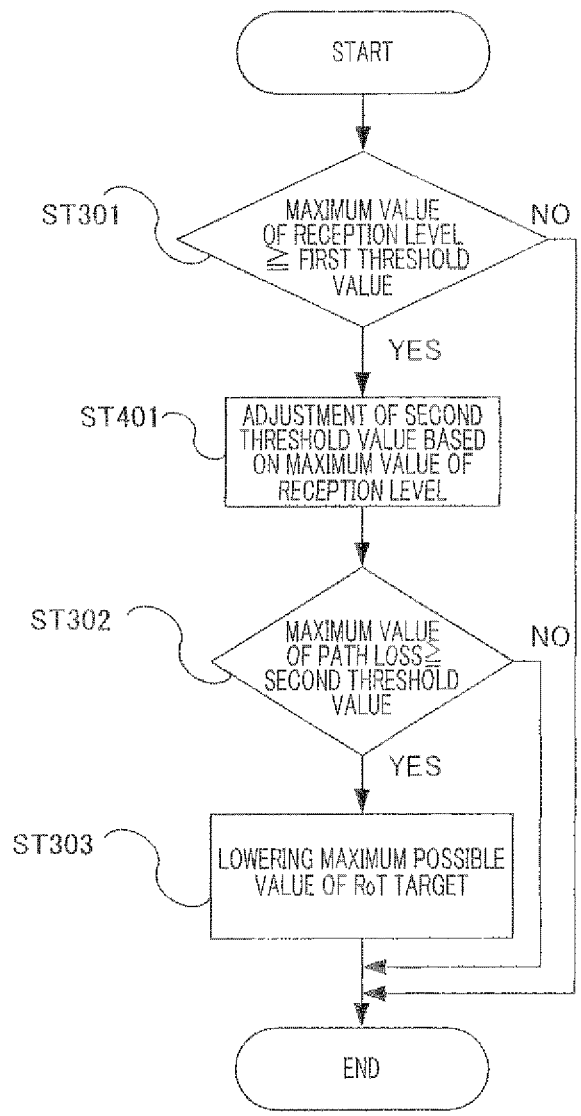
FIG. 9 is a flowchart showing the steps of interference control according to Embodiment 2 of the present invention.

FIG. 9 is a flowchart showing the steps of interference control according to Embodiment 2 of the present invention. Parts in FIG. 9 that are the same as in FIG. 6 will be assigned the same reference numerals as in FIG. 6 and overlapping explanations will be omitted. In FIG. 9, determination section 105 adjusts the second threshold value based on the maximum value of the macrocell signal reception power level (ST 401).

Here, when a femtocell is located farther from the center part of a macrocell, the amount of interference from an HUE to the macrocell decreases, so that there is less necessity to lower the maximum possible value of the target control value of total HNB reception power. While with Embodiment 1 only the range of lowering the maximum possible value of the target control value is adjusted depending on the macrocell signal reception power level, with Embodiment 2, the communication area of a femtocell in which the target control value is lowered itself is adjusted depending on the macrocell signal reception power level. More specifically, the communication area in which the target control value is not lowered is expanded by increasing the second threshold value when a macrocell signal reception power level is smaller, and the communication area in which the target control value is not lowered is reduced by decreasing the second threshold value when a macrocell signal reception power level is greater (ST 401).

Figure 10:
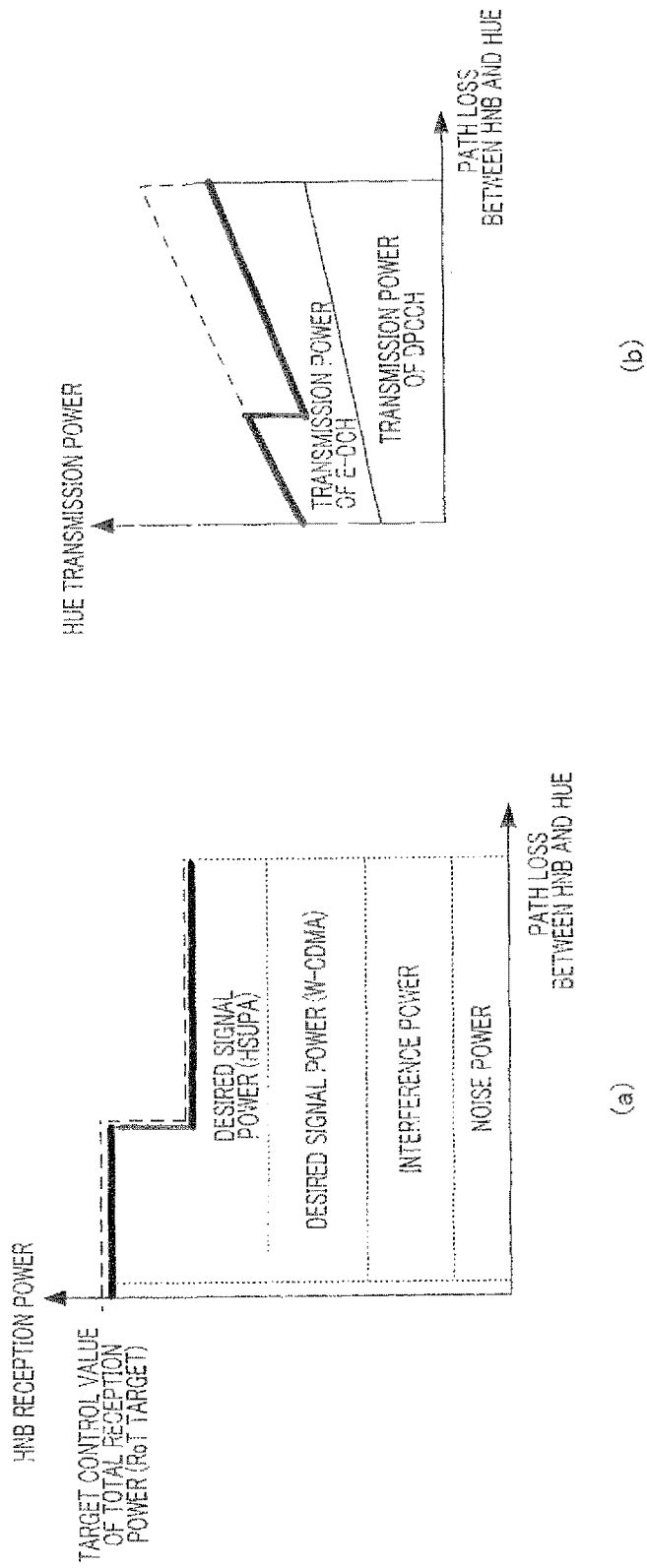
FIG. 10 is a graph showing changes of HNB reception power and HUE transmission power when interference control is used according to Embodiment 2 of the present invention.
Figure 11:
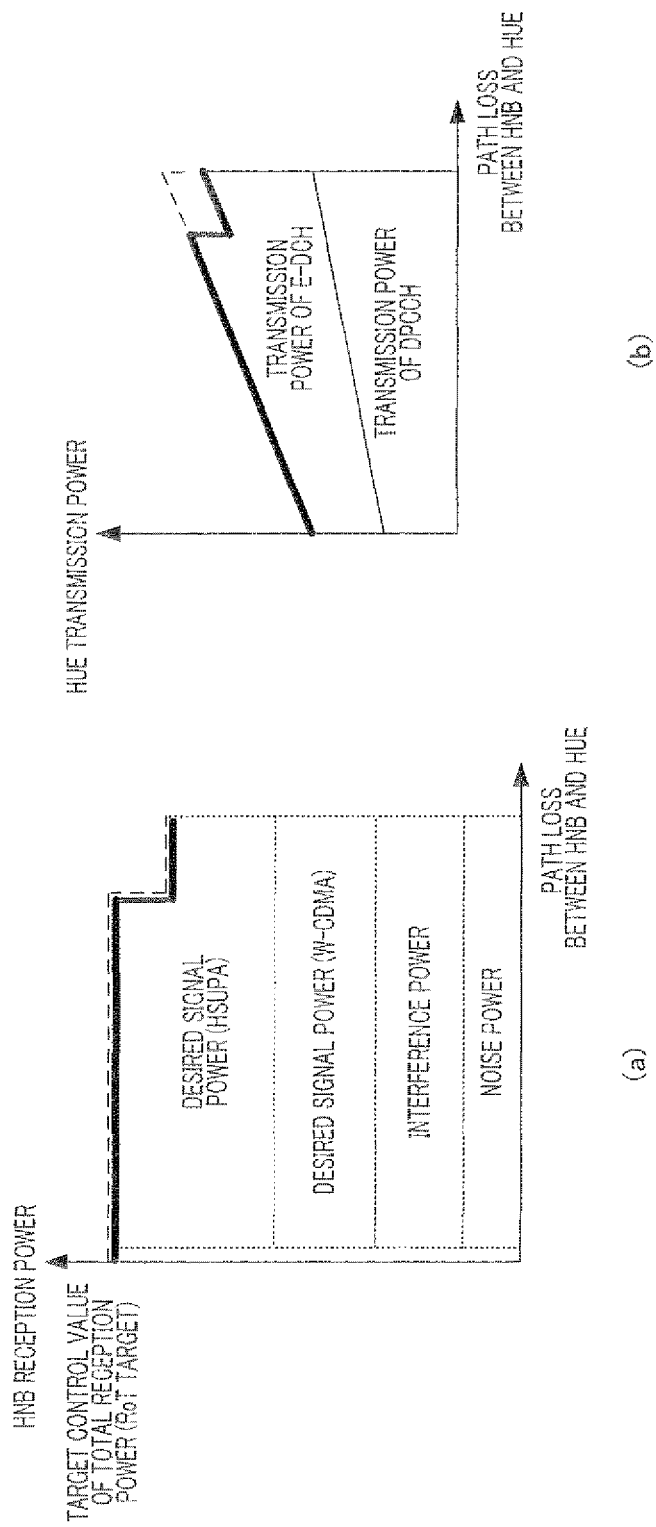
FIG. 11 is a graph showing changes of HNB reception power and HUE transmission power when interference control is used according to Embodiment 2 of the present invention.

FIGS. 10 and 11 are graphs showing changes of HNB reception power and HUE transmission power when interference control is used according to Embodiment 2 of the present invention. In FIGS. 10 and 11, each horizontal axis of the graphs indicates path loss between the HNB and the HUE. In FIGS. 10(a) and 11(a), each vertical axis of the graphs indicates HNB reception power. In FIGS. 10(b) and 11(b), each vertical axis of the graphs indicates HUE transmission power.

FIG. 10 shows a case where the macrocell signal reception power level at an HNB is large, and FIG. 11 shows a case where the macrocell signal reception power level at an HNB is small. FIG. 10 shows that the range of lowering the target control value is wide and the area in which the target control value is lowered is large (i.e. the target control value starts to be lowered at a stage where path loss between an HNB and an HUE is low). FIG. 11, on the other hand, shows that the range of lowering the target control value is narrow and the area in which the target control value is lowered is small (i.e. the target control value starts being lowered at a stage where path loss between an HNB and an HUE is greater).

Figure 12:
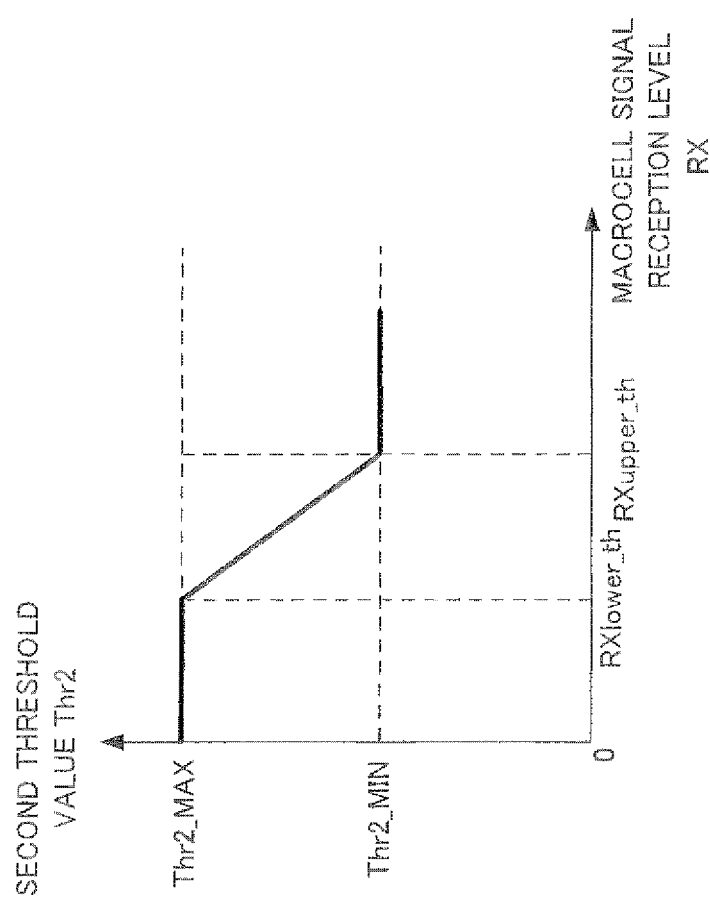
FIG. 12 is a graph showing the relationship between the second threshold value and the macrocell signal reception level when interference control is used according to Embodiment 2 of the present invention.

FIG. 12 is a graph showing the relationship between the second threshold value and the macrocell signal reception level when interference control is used according to Embodiment 2 of the present invention. In FIG. 12, the horizontal axis of the graph indicates the macrocell signal reception level, and the vertical axis indicates the second threshold value used for the comparison with path loss. The bold solid line indicates an example of control functions. Examples of control functions are not limited to the control function used in FIG. 12, and may include any functions to reduce the second threshold value when the macrocell signal reception level increases.

As described above, according to Embodiment 2, by adjusting the communication area of a femtocell in which the target control value is lowered itself depending on the macrocell signal reception power level, it is possible to realize more efficient interference control without excessively affecting the throughput of a femtocell. By this means, it is possible to prevent increase in signaling accompanying direct control of HUE transmission power, and it is possible to reduce uplink radio channel interference from an HUE to an MNB without wasting radio resources. Further, it is also possible to increase the transmission rate to allocate to the HUE that is located at a femtocell edge while maintaining the amount of interference to reduce in the whole femtocell.

Embodiment 3

A case will be described with Embodiment 3 where, in addition to the function of interference control described in Embodiment 1, a function of setting a plurality of threshold values that is used for comparison with path loss between an HNB and an HUE, and a function of changing the range of lowering the maximum possible value of the target control value of total reception power depending on path loss are provided. The configuration of the femto base station apparatus according to Embodiment 3 will be explained using FIG. 4 because the configuration is the same as the configuration of Embodiment 1 shown in FIG. 4.

Figure 13:
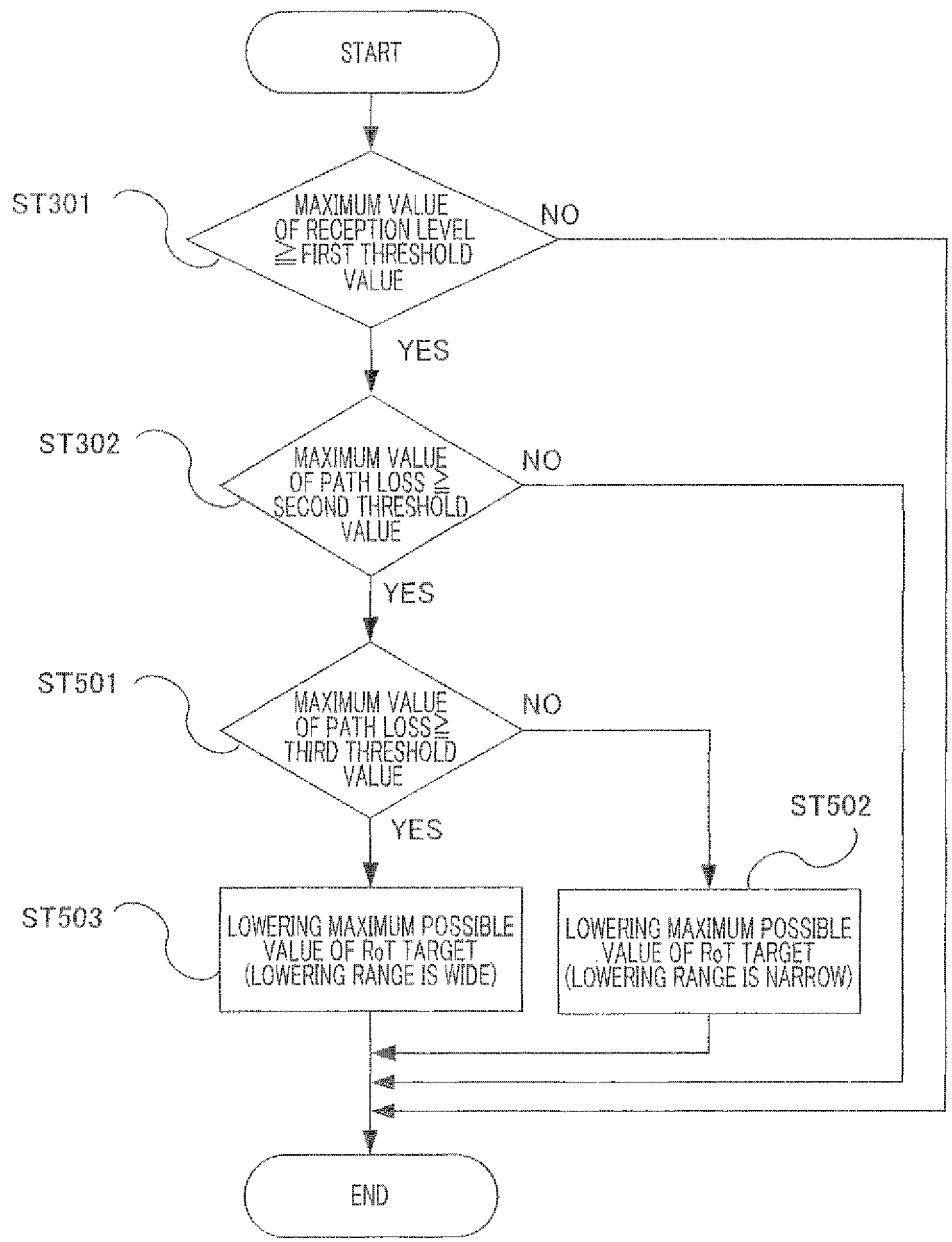
FIG. 13 is a flowchart showing the steps of interference control according to Embodiment 3 of the present invention.

FIG. 13 is a flowchart showing the steps of interference control according to Embodiment 3 of the present invention. Parts in FIG. 13 that are the same as in FIG. 6 will be assigned the same reference numerals as in FIG. 6 and overlapping explanations will be omitted. In FIG. 13, determination section 105 uses a third threshold value in addition to the second threshold value to compare with path loss between an HNB and an HUE (ST 501). Here, the third threshold value is greater than the second threshold value.

When path loss between an HNB and an HUE is equal to or greater than the second threshold value and is lower than the third threshold value, the range of lowering the maximum possible value of the target control value of total reception power is reduced (ST 502). On the other hand, when path loss between an HNB and an HUE is equal to or greater than the third threshold value, the range of lowering the maximum possible value of the target control value of total reception power is increased (ST 503).

Figures 14A, 14B:
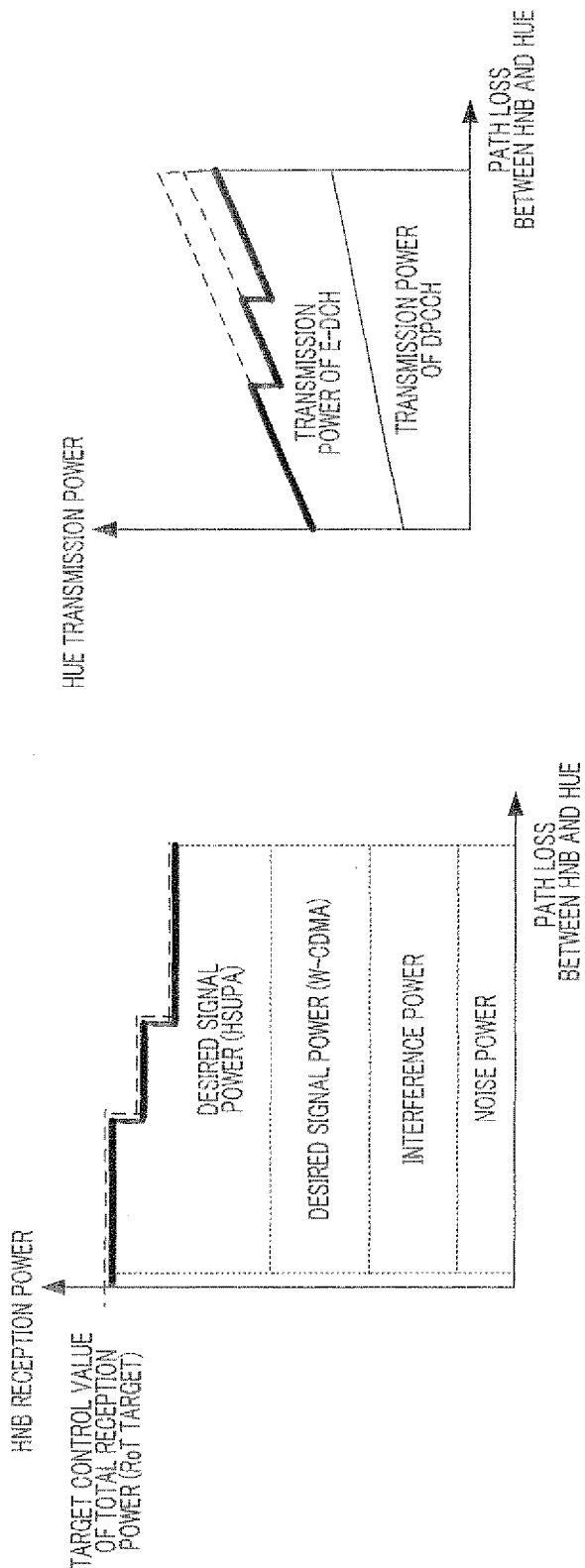
FIG. 14 shows the changes of HNB reception power and HUE transmission power when interference control is used according to Embodiment 3 of the present invention.

FIG. 14 shows changes of HNB reception power and HUE transmission power when interference control is used according to Embodiment 3 of the present invention. In FIG. 14, the horizontal axis of the graph indicates path loss between the HNB and the HUE. In FIG. 14(a), the vertical axis of the graph indicates HNB reception power and in FIG. 14(b), the vertical axis of the graph indicates transmission power. As is obvious in FIG. 14(b), by reducing the range of suppressing HUE transmission power in the area where path loss between an HNB and an HUE is relatively low it is possible to prevent terminal throughput from decreasing.

As described above, according to Embodiment 3, by changing the range of lowering the maximum possible value of the target control value of total reception power depending on path loss, it is possible to realize more efficient interference control without excessively affecting the throughput of a femtocell. By this means, it is possible to prevent increase in signaling accompanying direct control of HUE transmission power, and it is possible to reduce uplink radio channel interference from an HUE to an MNB without wasting radio resources. Further, it is also possible to increase the transmission rate to allocate to the HUE that is located at a femtocell edge while maintaining the amount of interference to reduce in the whole femtocell.

Although a case has been described with embodiment 2 as an example where two threshold values are used for comparison with path loss between an HNB and an HUE, the present invention is by no means limited to this, and it is equally possible to increase the number of threshold values to three or more. Further, although a case has been shown in FIG. 14(a) as an example where the maximum possible value of the target control value of total reception power is lowered stepwise, the maximum value of the target control value of total reception power may be lowered continuously depending on path loss between an HNB and an HUE.

Embodiment 4

A case will be described with Embodiment 4 where, in addition to the function of interference control described in Embodiment 1, upon adjustment of the maximum possible value of the target control value of total HNB reception power, the range of lowering the target control value is reduced when the required transmission power of a reference HUE is lower than the transmission power that can be allocated to the reference HUE based on the target control value of total HNB reception power. The configuration of a femto base station apparatus according to Embodiment 4 will be explained using FIG. 4 because the configuration of Embodiment 4 is the same as the configuration of Embodiment 1 shown in FIG. 4.

Figure 15:
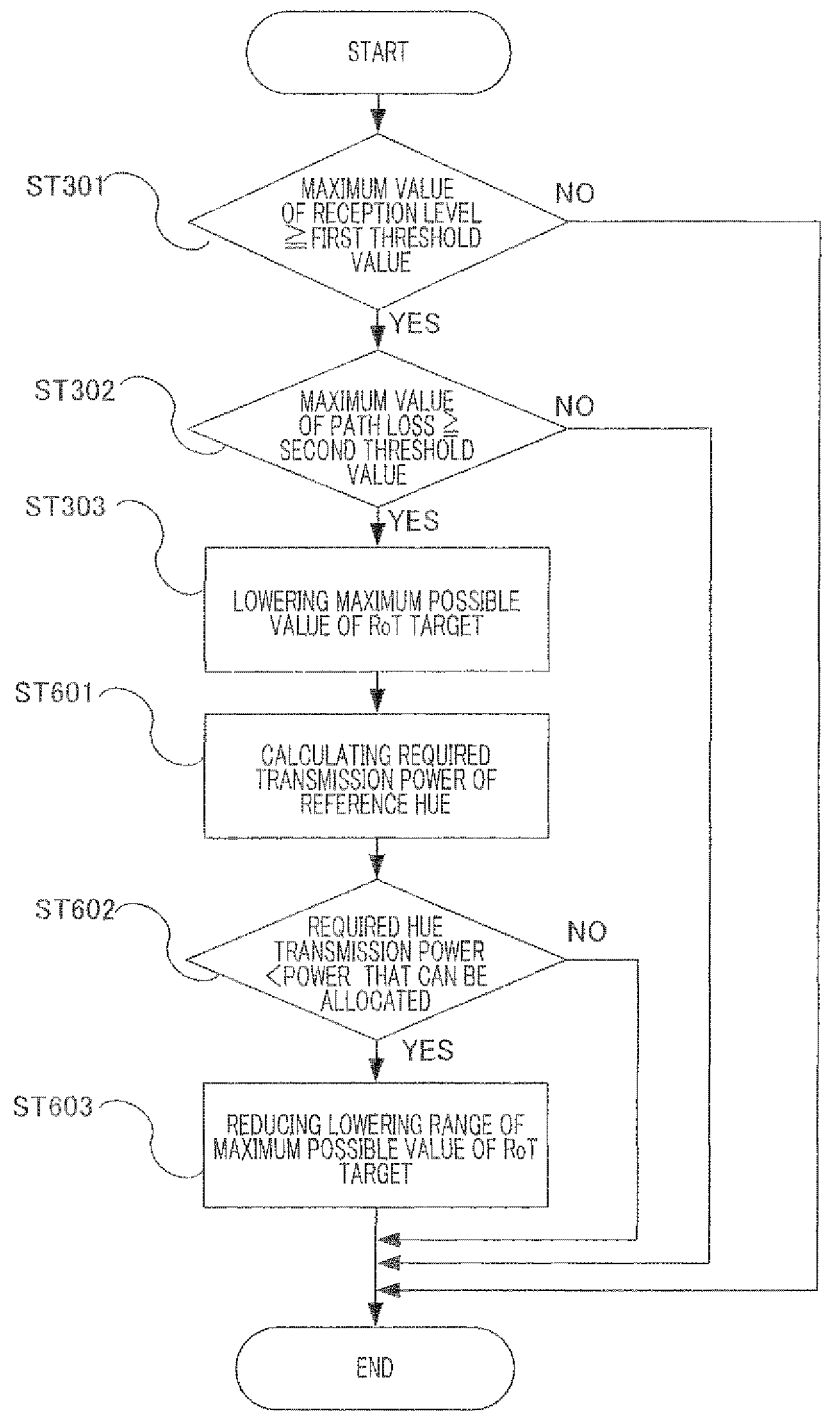
FIG. 15 is a flowchart showing the steps of interference control according to Embodiment 4 of the present invention.

FIG. 15 is a flowchart showing the steps of interference control according to Embodiment 4 of the present invention. Parts in FIG. 15 that are the same as in FIG. 6 will be assigned the same reference numerals as in FIG. 6 and overlapping explanations will be omitted. In FIG. 15, determination section 105 calculates the required transmission power with respect to the HUE having the maximum path loss with the HNB, based on path loss and the required transmission rate (ST 601).

Further, determination section 105 compares the required transmission power with transmission power that can be allocated to the HUE based on the target control value of total HNB reception power (calculated based on the reception power that can be allocated and path toss) (ST 602). If as a result of the comparison the required HUE transmission power is lower than the transmission power that can be allocated to the HUE, adjustment section 106 reduces the range of lowering the maximum possible value of the target control value of total reception power (ST 603).

Here, even if the lowering range is reduced, transmission power and transmission rate will not increase because the required transmission rate of the reference HUE is low. On the other hand, it is possible to increase transmission power and transmission rate for an HUE connected to the HNB other than the reference HUE. In other words, it is possible to improve throughput of femtocell uplink transmission without exceeding the amount of macrocell interference that is acceptable in the whole femtocell.

As explained above, according to Embodiment 4, by changing the range of lowering of the maximum possible value of the target control value of total HNB reception power depending on the required transmission power of a reference HUE, it is possible to realize more efficient interference control without excessively affecting the throughput of a femtocell. By this means, it is possible to prevent increase in signaling accompanying direct control of HUE transmission power, and it is possible to reduce uplink radio channel interference from an HUE to an MNB without wasting radio resources.

Embodiment 5

A case will be described with Embodiment 5 where, in addition to the function of interference control described in Embodiment 1, the maximum HUE transmission power is limited or the maximum possible value of the target control value of total HNB reception power is lowered, as a method of reducing interference, depending on whether path loss between an HNB and an HUE is equal to or greater than a threshold value with respect to all HUES connected to the HNB. The configuration of a femto base station apparatus according to Embodiment 5 will be explained using FIG. 4 because the configuration of Embodiment 5 is the same as the configuration of Embodiment 1 shown in FIG. 4.

Figure 16:
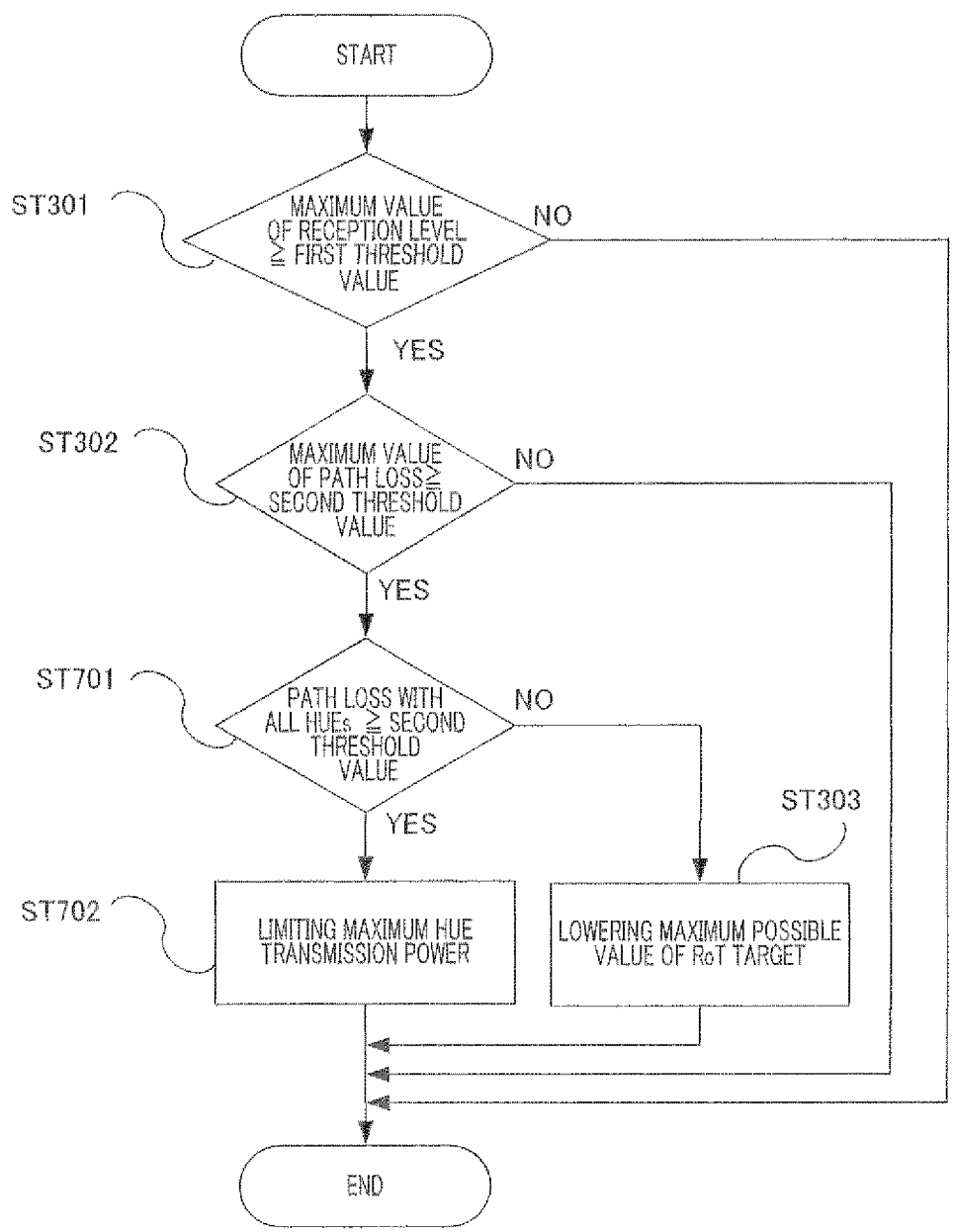
FIG. 16 is a flowchart showing the steps of interference control according to Embodiment 5 of the present invention.

FIG. 16 is a flowchart showing the steps of interference control according to Embodiment 5 of the present invention. Parts in FIG. 16 that are the same as in FIG. 6 will be assigned the same reference numerals as in FIG. 6 and overlapping explanations will be omitted. In FIG. 16, determination section 105 determines whether path loss between an HNB and an HUE is equal to or greater than a second threshold value with respect to all HUEs that are connected to an HNB (ST 701). In other words, determination section 105 determines whether not all HUEs are located at a femtocell edge or not.

When all HUEs are located at a femtocell edge, transmission power is high with respect to all HUEs, so that there is a possibility that the total amount of interference from the femtocell to a macrocell exceeds the acceptable range. In this case, it is ensured that the total amount of interference from a femtocell to a macrocell is set within a constant value by directly limiting the maximum value of HUE transmission power (ST 702).

On the other hand, if there is even a single HUE located apart from a femtocell edge, the maximum possible value of the target control value of total HNB reception power is lowered (ST 303). By this means, by decreasing the transmission rate to allocate to an HUE and transmission power of an HUE in the vicinity of an HNB while allowing increase in transmission power of an HUE located at a femtocell edge, it is possible to maintain the total amount of interference from a femtocell to a macrocell.

As explained above, according to Embodiment 5, by switching to an interference control method of directly limiting the maximum value of HUE transmission power, it is possible to ensure that the total amount of interference from a femtocell to a macrocell is suppressed within a constant value. By this means, it is possible to take measures against an exceptional case where HUEs are located at a femtocell edge in a concentrated manner.

Although a method has been described with the present embodiment as an example whereby whether path loss between an HNB and an HUE is equal to or greater than a second threshold value is determined with respect to all HUES connected to an HNB, the present invention is by no means limited to this, and it is equally possible to use other determination conditions as long as an essence of changing the interference reduction method depending on the position of all HUEs in a femtocell is maintained. For example, it is possible to change the interference reduction method depending on degree of variation in the position of HUEs in a femtocell by computing a distribution of HUEs in the femtocell (distribution of path loss).

Embodiment 6

A case will be described with Embodiment 6 where, in addition to the function of interference control described in Embodiment 1, the range of lowering the maximum possible value of the target control value of total HNB reception power is set depending on information about macrocell uplink channel interference by receiving from an MNB a broadcast signal containing information about macrocell uplink channel interference. The configuration of a femto base station apparatus according to Embodiment 6 will be explained using FIG. 4 because the configuration is the same as the configuration of Embodiment 1 shown in FIG. 4.

Figure 17:
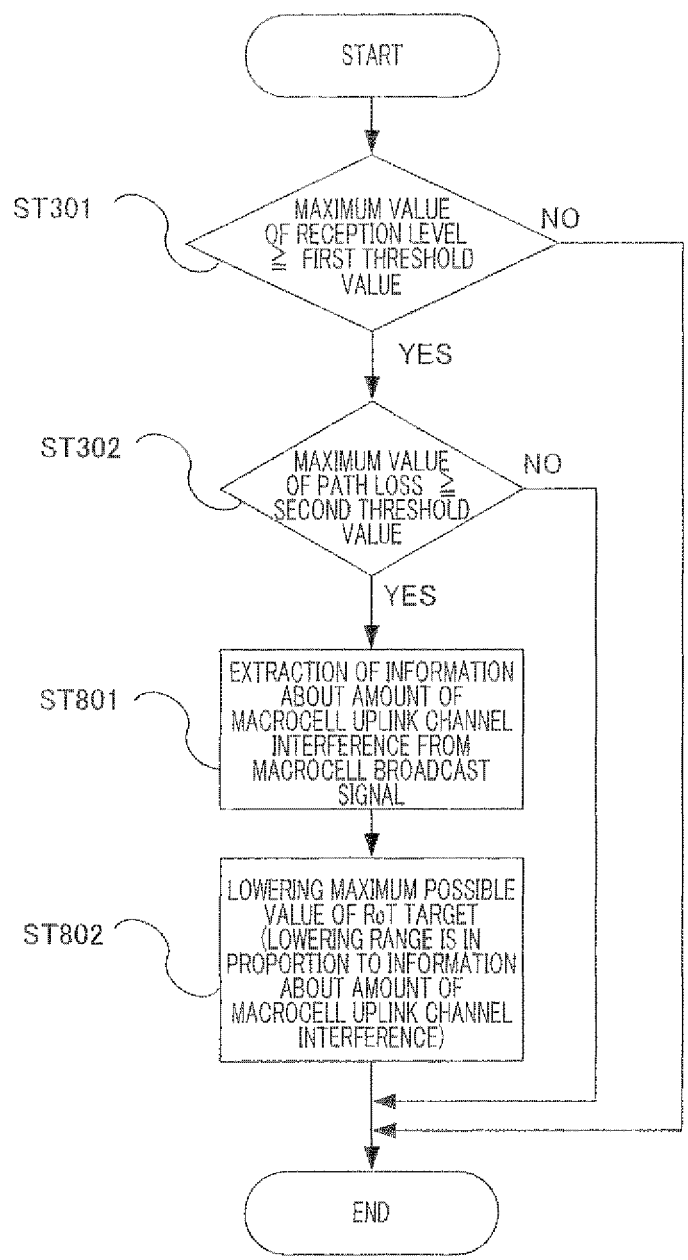
FIG. 17 is a flowchart showing the steps of interference control according to Embodiment 6 of the present invention.

FIG. 17 is a flowchart showing the steps of interference control according to Embodiment 6 of the present invention. Parts in FIG. 17 that are the same as in FIG. 6 will be assigned the same reference numerals as in FIG. 6 and overlapping explanations will be omitted. In FIG. 17, measurement section 103 extracts information about the amount of macrocell uplink channel interference contained in a macrocell broadcast signal (BCH) (ST 801).

The range of lowering the maximum possible value of the target control value of total HNB reception power is set depending on the extracted information about the amount of macrocell uplink channel interference (ST 802). That is, the lowering range is reduced when the amount of macrocell interference is small, and the lowering range is increased when the amount of macrocell interference is large.

Figure 18:
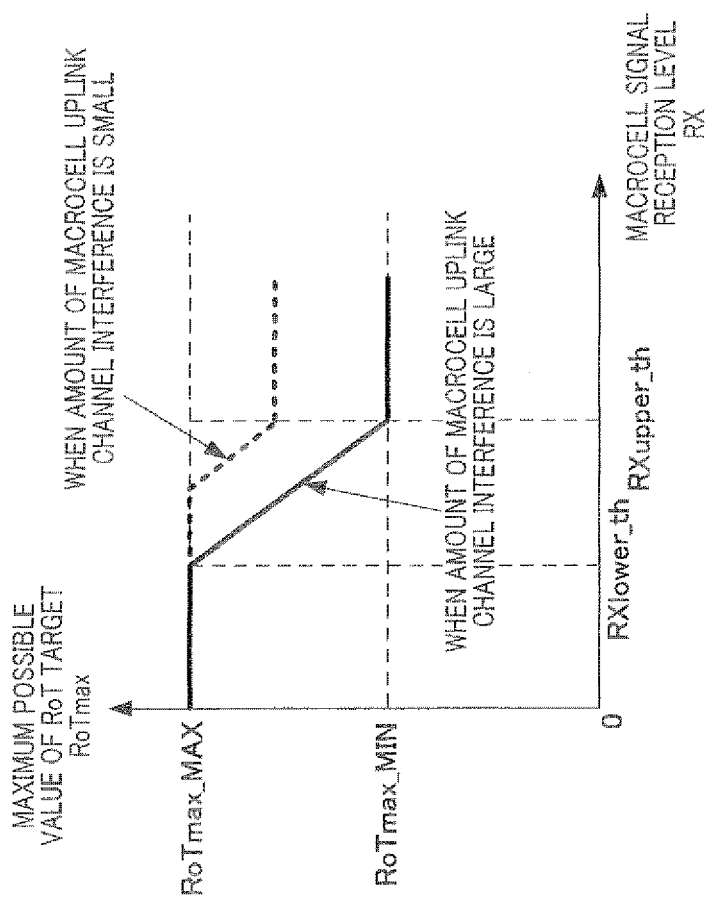
FIG. 18 is a graph showing the relationship between the macrocell signal reception level and the maximum possible value of the target control value of total HNB reception power at a femto base station according to Embodiment 6.

FIG. 18 is a graph showing the relationship between the maximum possible value of the target control value of total HNB reception power and the macrocell signal reception level according to the present embodiment. Here, the adjustment function for the maximum possible value of the target control value of total HNB reception power is changed depending on the amount of macrocell uplink channel interference.

When the amount of interference in one femtocell is constant, the total amount of macrocell interference varies depending on the number and positions of femtocells in the macrocell. Accordingly, it is necessary to adjust the lowering range depending on the amount of macrocell uplink channel interference to optimize the reduction of interference between a macrocell and a femtocell.

As explained above, according to Embodiment 6, by changing the range of lowering the maximum possible value of the target control value of total reception power depending on the amount of macrocell uplink channel interference, it is possible to realize more efficient interference control without excessively affecting the throughput of a femtocell. By this means, it is possible to prevent increase in signaling accompanying direct control of HUE transmission power, and it is possible to reduce uplink radio channel interference from an HUE to an MNB without wasting radio resources. Further, it is also possible to increase the transmission rate to allocate to the HUE that is located at a femtocell edge while maintaining the amount of interference to reduce in the whole femtocell.

Although a case has been described with the present embodiment as an example where information about macrocell uplink channel interference is transmitted via a broadcast signal (BCH), the present invention is by no means limited to this, and it is equally possible to transmit information about macrocell uplink channel interference via a wired line between an MNB and an HNB.

As shown above, embodiments of the present invention have been described.

Although cases have been described with the above embodiments as examples where a measurement section of an HNB measures a macrocell signal reception level, the present invention is by no means limited to this, and it is equally possible to use the result of the macrocell signal reception level measured by an HUE, without changing the subject matter of the present invention. That is, it is equally possible to perform interference control as described in the above embodiments by reporting the macrocell signal reception level measured by an HUE to an HNB via an uplink channel.

Although cases have been described with the above embodiments as examples where a measurement section of an HNB measures a macrocell signal reception level, the present invention is by no means limited to this, and it is equally possible to reduce uplink radio channel interference between femtocells by measuring a reception power level of a signal from the femtocell neighboring to another femtocell.

Although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI," depending on differing extents of integration.

Further, the method of circuit integration is not limited to LSI's, and implementation using dedicated circuitry or general purpose processors is also possible. After LSI manufacture, utilization of a programmable field programmable gate array (FPGA) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is possible, for example.

The disclosure of Japanese Patent Application No. 2008-304662, filed on Nov. 28, 2008, including the specification, drawings and abstract, is incorporated herein by reference in its entirety.

INDUSTRIAL APPLICABILITY

A radio communication base station apparatus and a transmission power control method according to the present invention is suitable for use in mobile telephone communication system, for example.

The invention claimed is:

1. A radio communication base station apparatus comprising:
a measurement section that measures reception levels of signals transmitted from a macrocell radio communication base station apparatus;
an estimation section that estimates path losses between the radio communication base station apparatus and radio communication terminal apparatuses that are connected to the radio communication base station apparatus;
a determination section that compares a maximum reception level out of the measured reception levels with a first threshold value and compares a maximum path loss out of the estimated path losses with a second threshold; and
an adjustment section that lowers a maximum possible value of a target control value of total reception power at the radio communication base station apparatus when the maximum reception level is equal to or greater than the first threshold value and the maximum path loss is equal to or greater than the second threshold value.

2. The radio communication base station apparatus according to claim 1, wherein the adjustment section sets the lowering range depending on the maximum reception level.

3. The radio communication base station apparatus according to claim 1, wherein the determination section adjusts the second threshold value depending on the maximum reception level.

4. The radio communication base station apparatus according to claim 1, wherein the adjustment section sets the lowering range depending on the maximum path loss.

5. The radio communication base station apparatus according to claim 1, wherein the adjustment section reduces the lowering range when required transmission power of a radio communication terminal apparatus having maximum path loss with the radio communication base station apparatus is less than transmission power that can be allocated to the radio communication terminal apparatus, based on the target control value of total reception power at the radio communication base station apparatus, the maximum path loss being maximum among all radio communication terminal apparatuses that are connected to the radio communication base station apparatus.

6. The radio communication base station apparatus according to claim 1, wherein the adjustment section lowers a control value of the maximum transmission power of the radio communication terminal apparatuses that are connected to the radio communication base station apparatus, without adjusting the maximum possible value of the target control value of total reception power at the radio communication base station apparatus, when the path loss is equal to or greater than the second threshold value for the radio communication terminal apparatuses that are connected to the radio communication base station apparatus.

7. The radio communication base station apparatus according to claim 1, wherein the adjustment section sets the lowering range depending on information about the amount of macro cell uplink channel interference.

8. A transmission power control method comprising:
a measurement step of measuring reception levels of signals transmitted from a macrocell radio communication base station apparatus;
an estimation step of estimating path losses between the radio communication base station apparatus and radio communication terminal apparatuses that are connected to the radio communication base station apparatus;

a determination step of comparing a maximum reception level out of measured reception levels with a first threshold value and of comparing a maximum path loss out of the estimated path losses with a second threshold; and an adjustment step of lowering a maximum possible value of a target control value of total reception power at the radio communication base station apparatus when the maximum reception level is equal to or greater than the first threshold value and the maximum path loss is equal to or greater than the second threshold value.

* * * * *

UNITED STATES PATENT AND TRADEMARK OFFICE
CERTIFICATE OF CORRECTION

| | |
|---|---|
| PATENT NO. | : 8,417,280 B2 |
| APPLICATION NO. | : 13/128849 |
| DATED | : April 9, 2013 |
| INVENTOR(S) | : Keisuke Ebiko |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

In the Claims:

Column 14, claim 7, line 59, incorrectly reads:

"macro cell uplink channel interference."

and should read:

"macrocell uplink channel interference.".

Signed and Sealed this
Twenty-second Day of April, 2014

Michelle K. Lee
*Deputy Director of the United States Patent and Trademark Office*